US012613306B2

(12) United States Patent
    Fei et al.

(10) Patent No.:  US 12,613,306 B2
(45) Date of Patent:      Apr. 28, 2026

(54) METHOD FOR IDENTIFYING INTERFERENCE IN A RADAR SYSTEM

(71) Applicant: Hella GmbH & Co. KGaA, Lippstadt (DE)

(72) Inventors: Tai Fei, Hamm (DE); Christopher Grimm, Lippstadt (DE); Frank Gruenhaupt, Marsberg (DE); Ernst Warsitz, Paderborn (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 649 days.

(21) Appl. No.: 17/827,153

(22) Filed: May 27, 2022

(65) Prior Publication Data

US 2022/0291329 A1      Sep. 15, 2022

Related U.S. Application Data

(63) Continuation      of      application      No. PCT/EP2020/080944, filed on Nov. 4, 2020.

(30) Foreign Application Priority Data

Nov. 28, 2019      (DE) ..................... 10 2019 132 268.5

(51) Int. Cl.
    *G01S 7/02*        (2006.01)
    *G01S 13/931*      (2020.01)
    *G06N 3/08*        (2023.01)
(52) U.S. Cl.
    CPC .............. *G01S 7/02* (2013.01); *G01S 13/931* (2013.01); *G06N 3/08* (2013.01)

(58) Field of Classification Search
    CPC ............ G01S 7/02; G01S 13/931; G06N 3/08
    See application file for complete search history.

(56) References Cited

U.S. PATENT DOCUMENTS

| | | | |
|---|---|---|---|
| 10,451,712 B1 | 10/2019 | Madhow et al. | |
| 2018/0149730 A1 | 5/2018 | Li et al. | |
| 2020/0088838 A1* | 3/2020 | Melzer .................... | G01S 7/352 |
| 2021/0003665 A1* | 1/2021 | Laddha ............... | G01S 13/9011 |

FOREIGN PATENT DOCUMENTS

| | | | | |
|---|---|---|---|---|
| CN | 108494710 A | * | 9/2018 | .......... H04B 10/116 |
| DE | 102017007961 A1 | * | 1/2018 | |
| DE | 102018000880 B3 | | 2/2019 | |
| DE | 102017216435 A1 | | 3/2019 | |
| KR | 2137825 B1 | * | 7/2020 | .......... G01S 13/931 |

OTHER PUBLICATIONS

International Search Report dated Feb. 5, 2021 in corresponding application PCT/EP2020/080944.

* cited by examiner

*Primary Examiner* — Vladimir Magloire
(74) *Attorney, Agent, or Firm* — Muncy, Geissler, Olds & Lowe, P.C.

(57)                ABSTRACT

A method for identifying interference in a radar system of a vehicle, wherein the following steps are carried out: receiving at least one incoming signal of the radar system; determining detection information from the incoming signal; performing an evaluation of the detection information by at least one neural network; and using a result of the evaluation as a prognosis of interference with the incoming signal.

12 Claims, 7 Drawing Sheets

METHOD FOR IDENTIFYING INTERFERENCE IN A RADAR SYSTEM

This nonprovisional application is a continuation of International Application No. PCT/EP2020/080944, which was filed on Nov. 4, 2020, and which claims priority to German Patent Application No. 10 2019 132 268.5, which was filed in Germany on Nov. 28, 2019, and which are both herein incorporated by reference.

BACKGROUND OF THE INVENTION

Field of the Invention

The present invention relates to a method for identifying interference in a radar system. Further, the invention relates to a corresponding radar system and to a computer program.

Description of the Background Art

It is known from the prior art that radar systems are used in vehicles to detect a vehicle's surroundings. It is also known that further parameters of detected objects can be determined by means of signal processing in the radar system, such as, e.g., the distance, relative speed, or the angle of the target in relation to the vehicle. Today, radar systems of this kind are already used in very many vehicles. Further, it is also possible for individual vehicles to have more than one radar system.

However, the increasing use of radar systems also brings with it the disadvantage that different radar systems can have a negative impact on each other. Such disturbances caused by mutually influencing radar systems are also referred to as interferences.

It is often still a problem that interferences cannot be reliably detected or eliminated in a radar system.

SUMMARY OF THE INVENTION

It is therefore an object of the present invention to reduce the above-described disadvantages. In particular, an object is to provide a more reliable detection of disturbances due to interferences in a radar system.

The preceding object is achieved by a method, by a radar system, and by a computer program. Further features and details of the invention emerge from the particular dependent claims, the description, and the drawings. In this regard, features and details that are described in relation to the method of the invention also apply, of course, in relation to the radar system of the invention and to the computer program of the invention, and conversely in each case, so that with regard to the disclosure, reference is or can always be made mutually to the individual aspects of the invention.

The object is achieved in particular by a method for identifying disturbances, in particular for identifying and/or reducing interference in a radar system of a vehicle.

In this case, it is provided in particular that the following steps are carried out, for example, one after another in the order specified or in any order, wherein individual and/or all steps can also be carried out repeatedly: receiving at least one (in particular electromagnetic) incoming signal of the radar system, preferably by a radar sensor and/or by at least one antenna (or alternatively in digitized form by an analog-to-digital converter) of the radar system; determining, in particular digital, detection information from the (received) incoming signal, preferably by a demodulator and/or by a down-converter and/or by an analog-to-digital converter of the radar system, wherein preferably the (possibly previously demodulated and/or down-converted) detection information is provided in digital form for the subsequent steps by an analog-to-digital conversion, in particular by a processing device of the radar system; performing an evaluation of the (determined) detection information, preferably by at least one neural network and/or by taking into account already performed evaluations of detection information, already determined from incoming signals in previous steps of the method, (hereinafter briefly: taking into account previous evaluations); and using a result of the evaluation, in particular the output of the neural network, as a prognosis (in particular a prediction) of a disturbance, in particular interference, of the incoming signal.

The advantage can be achieved hereby that a more reliable and possibly faster detection of the interference is made possible by the evaluation, specifically, e.g., by using a neural network and/or by taking into account previous evaluations. This can be due to the fact that not (only) a currently present interference is detected, but even the prognosis of the interference is made possible by the evaluation. For this purpose, the evaluation can be carried out such that a recurring course and/or a recurring pattern and/or a temporal correlation of the interference in the detection information are identified on the basis of the previous evaluations. Thus, the neural network can be able to do this if there is a temporal linkage of neurons in terms of feedback loops (as in a recurrent neural network). In this way, temporally encoded information can be identified in detection information, which is specific to the interference and therefore also enables a prognosis of the interference.

The method of the invention can be carried out at least partially as a computer-implemented method, so that performing the evaluation and/or using the result and/or determining the detection information and/or receiving the incoming signal are performed within the scope of a digital signal processing of the radar system. Specifically, a processing device of the radar system can be used to this end, which, e.g., comprises a processor and a memory for this purpose. It can also be advantageous if only some of the steps are computer-implemented or performed by the processing device, and other steps such as "receiving the incoming signal" and also partially determining the detection information are performed by other dedicated components of the radar system. A significant increase in performance for the execution of the method can be achieved thereby if necessary.

In particular, the disturbance can be implemented as an interference and/or as an interference caused by another radar system, e.g., of another vehicle. Thus, the interference detection is used to detect interference that affects the incoming signal. Such interference can be caused, for example, by the radar signals from different radar systems influencing one another and/or interfering with each other. Accordingly, a method of the invention can use the result of the evaluation to detect and/or predict disturbances, in particular interferences by other radar systems, in the detection information (for example, in the form of a time signal and/or radar spectrum and/or spatial distribution of target objects). A significantly improved evaluation of the detection information is thus possible.

A further advantage within the scope of the invention is achievable if, as a further step of the method of the invention, after the detection information has been determined, a Fourier transformation of the detection information is performed in order to obtain information about a relative speed and/or a distance of targets in the vehicle's surroundings (i.e., target objects) from the provided detection information. This information can then be used, e.g., for object detection. The targets can be, e.g., reflections and/or objects in the environment.

Optionally, it can be provided that providing the detection information comprises demodulation and/or down-conversion and/or analog-to-digital conversion of the incoming signal to obtain the provided detection information as a time signal. This enables a reliable detection of the incoming signal.

For example, it can be provided that the at least one neural network or at least one neural network comprises at least one recurrent neural network (RNN), which preferably takes into account the evaluations of temporally preceding detection information. Here, an output of the neural network can be used as the result of the evaluation. It is possible thereby that this output is determined based on an output of the RNN; e.g., after the output of the RNN has been further processed by a decoder. The consideration of temporally preceding evaluations made thereby makes it possible to determine a temporally encoded information in the detection information, in order to provide a prognosis of the interference with its use. For this purpose, e.g., for each hidden layer of the RNN there can be a context unit that processes an output of a neuron and outputs it again in the following time step. Further, the RNN can be trained to perform the prognosis of the interference, so that already in the current iteration of the method steps, the output of the RNN indicates the likely occurrence of the interference in the subsequent iteration or one of the subsequent iterations. For this purpose, for example, training of the RNN by training data which will still be described in more detail is used. Training can be performed, for example, by means of backpropagation through time (BPTT).

A possible variant for training the prognosis for the neural network or specifically for the RNN can be that the network is trained with training data, which consist of input data (input) and the associated output data (output). In the context of "supervised learning," the output data can contain the correct output expected with the associated input data. The correct output can be, e.g., the prognosis of an interference in the detection information determined only subsequently, e.g., in the form of a label and/or segmentation in the current detection information. The detection information can, for example, be in the form of a two-dimensional image in which a corresponding segmentation mask can be superimposed by the output.

A sequence of temporally successively determined information (e.g., the detection information or a sequence of information resulting from further processing of this detection information) $E_{t-2}$, $E_{t-1}$, $E_t$, $E_{t+1}$ are used, e.g., as input data for the training. Accordingly, this information is specific to temporally successive determined detection information. A, for example, manually created sequence of labels (marking or segmentation) $A_{t-2}$, $A_{t-1}$, $A_t$, $A_{t+1}$ of the interference in the input data can be used as output data. The label $A_{t-2}$ of the detection cycle t−2 thus identifies the interference in the information $E_{t-2}$. The label $A_{t-1}$ of the detection cycle t−1 identifies the interference in the information $E_{t-1}$, etc.

Training with the mentioned training data would be sufficient to train the network to detect the interference in a current detection cycle in the input data. In order to additionally perform the prognosis, the order of the sequences for training can be changed. Specifically, the (detection) information used for the input data $E_{t-2}$, $E_{t-1}$, $E_t$, $E_{t+1}$ can be moved forward in terms of the order in the sequence, or the labels $A_{t-2}$, $A_{t-1}$, $A_t$, $A_{t+1}$ can be moved backward. In other words, a new sequence can thus be defined as the new output data A' according to the relation: $A'_{t-x} = A_{t-x+1}$. The advantage is achieved thereby that when training in an iteration (therefore, a detection cycle), the label $A_{t-x+1}$ used therein as output data does not correspond to the interference in the information $E_{t-x}$ of the current iteration, but already to the information $E_{t-x+1}$ of the subsequent iteration. Because this label $A_{t-x+1}$ corresponds to the desired output of the network, the network is trained to output a prognosis of the label $A_{t-x+1}$ from the information $E_{t-x}$. In this way, the evaluation of temporally preceding detection information can also be made possible.

Furthermore, it is optionally possible that the at least one neural network comprises at least one convolutional neural network (CNN), which preferably receives the detection information as input, and the output of which is used as input to the recurrent neural network. This makes it possible, e.g., to reduce the amount of data of the detection information for processing by the RNN and/or to pre-evaluate it for extracting information about the interference. This can improve the performance of processing by the RNN. For this purpose, the CNN is trained, e.g., with training data, which consists of input data (input) and the associated output data (output). In the context of "supervised learning," the output data can contain the correct output expected with the associated input data. The input data are, e.g., the unmodified detection information and the output data are a reduced (scaled) version of the detection information or a label of the interference. In this way, the CNN is trained to provide an optimized input to the RNN as output.

In a further option, it can be provided that performing the evaluation of the detection information comprises the following steps: preprocessing the detection information of a detection cycle, preferably by max-pooling, in particular to reduce the data size of the detection information; extracting information about the interference in the form of at least one interference in the incoming signal from the preprocessed detection information, in particular by a convolutional neural network; performing a prognosis of the at least one interference for a temporally subsequent detection cycle based on the extracted information, and in particular based on the evaluations of temporally preceding detection information, preferably by an RNN.

This has the advantage that an interference can be detected particularly reliably and quickly even before it affects the detection information.

Further, it is optionally provided that using the result of the evaluation, in particular an output of the neural network, comprises the following step: providing the prognosis by an output of the frequency range in which the interference will be present in the future.

This takes advantage of the fact that the disturbance, especially in the form of an interference, affects only a limited frequency range. Thus, the interference can be reliably characterized on the basis of the frequency range and, if necessary, even reduced. To train the network for this mode of operation, output data can be used for the training data in which the frequency range for an interference was manually entered in the input data.

Preferably, it can provided that using the result of the evaluation, in particular an output of the neural network, comprises the following step: electronic outputting the result to an electronic system of the vehicle, preferably for a control unit of the vehicle.

This makes it possible that when the interference occurs, the control unit is informed and can react to it. For example, the corrupted detection information is discarded.

It is also optionally conceivable that the result of the evaluation comprises a segmentation of the detection information which indicates the predicted interference. For this purpose, for example, output data in which this (predicted) segmentation was manually performed for the associated input data can be used as training data for the network.

According to a further option, it can be provided that the at least one neural network is trained by providing (and in particular performing beforehand) the following training steps: storing a plurality of temporally successively determined detection information, in particular a sequence of successively determined detection information; providing output data, in particular ground truth data, by in particular manual labeling of interferences, in particular disturbances, in the detection information; and training the neural network using training data formed from the detection information and the output data, in particular ground truth data.

The input data can thus be formed from the sequence of the detection information. The ground truth data then represents the desired output that the network should output when the input data are input. Specifically, the desired output can therefore comprise the prognosis of the interference.

It can be provided for this purpose, for example, that providing the ground truth data comprises the following step: manually labeling the interferences (especially predicted interferences) to teach the at least one neural network by the training to predict the interferences as the disturbance in the incoming signal.

According to a further advantage, it can be provided that, for a detection cycle, a plurality of transmission signals of the radar system are transmitted in succession, each in at least one frequency range, in order to receive an associated incoming signal in each case, wherein the transmission signal is implemented in each case as at least one chirp with a time-varying frequency within the frequency range. It can be possible in this case that further frequency ranges are provided in which the transmitted signal can also be transmitted.

Further, it can be provided within the scope of the invention that determining the detection information is performed per detection cycle (iteratively), and preferably comprises the following steps in each case: performing a mixing of the respective transmission signal and the associated incoming signal so as to obtain a baseband signal in each case; and determining the detection information from the obtained baseband signals, wherein the detection information is specific to an object detection in the vehicle's surroundings.

The vehicle's surroundings can be reliably detected thereby by the radar system.

It is further conceivable that the result of the evaluation has an indication of an interference frequency range in which the interference is predicted in a temporally subsequent detection cycle, wherein preferably using the result of the evaluation comprises an automatic and at least partial adjustment of the frequency range. In this way, the transmission signals can be transmitted in the frequency range which is at least partially outside the predicted interference frequency range. Thus, the at least one frequency range can be implemented as an at least partially variable frequency range. This enables the reliable reduction of the interference, because the interference frequency range is bypassed.

The object of the invention also is a radar system for detecting target objects in a vehicle's surroundings, having a processing device which is adjusted so that the processing device carries out the following steps: providing detection information from an incoming signal of the radar system, e.g., by digital reception and/or an analog-to-digital conversion of the detection information; performing an evaluation of the detection information, in particular by at least one neural network; and using a result of the evaluation as a prognosis of interference with the incoming signal.

Thus, the radar system of the invention provides the same advantages as have been described in detail with reference to a method of the invention. In addition, the radar system can be suitable for performing the steps of a method of the invention. The steps of "receiving at least one incoming signal of the radar system" and/or "determining detection information" can be performed, e.g., by a radar sensor of the radar system at least partially in order to provide the detection information digitally for the evaluation.

These steps performed by the radar sensor can possibly also include demodulation and/or down-conversion. The further steps, but possibly also the demodulation and/or the down-conversion, can be performed by the processing device. In other words, the processing device can perform only part of the steps, but optionally also all of the steps, of a method of the invention. It can be possible thereby that a processor is provided which, when executed by the processing device, causes it to perform the steps of a method of the invention. This processor is implemented, e.g., as a computer program of the invention. The processing device has, for example, a processor and/or a memory in which the processor is stored and can be read out by the processor. The processing device is designed, for example, as a computer and/or control unit of the vehicle and/or the like.

The radar system is designed, for example, as a 24 GHz or a 77 GHz radar system. Alternatively or in addition, the radar system is designed as a continuous-wave radar, in particular as an FMCW (frequency-modulated continuous-wave radar), which can perform a distance and/or speed measurement.

Further, the vehicle can be a motor vehicle and/or passenger vehicle and/or autonomous vehicle and/or electric vehicle and/or the like. The detection information is used, for example, by an on-board component, such as an assistance system and/or a control unit of the vehicle, which advantageously provides at least partially autonomous driving and/or automatic parking of the vehicle.

A subject of the invention also is a computer program, preferably a computer program product. It is provided hereby that the computer program has instructions which, when the computer program is executed by a processing device, cause the processing device to perform the steps of a method of the invention at least in part, and/or specifically to perform the following steps: providing detection information from an incoming signal of the radar system, e.g., by digital reception and/or an analog-to-digital conversion of the detection information; performing an evaluation of the (provided) detection information, in particular by at least one neural network; and using a result of the evaluation as a prognosis of interference with the incoming signal.

Thus, the computer program of the invention provides the same advantages as have been described in detail with reference to a method of the invention and/or a radar system of the invention.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
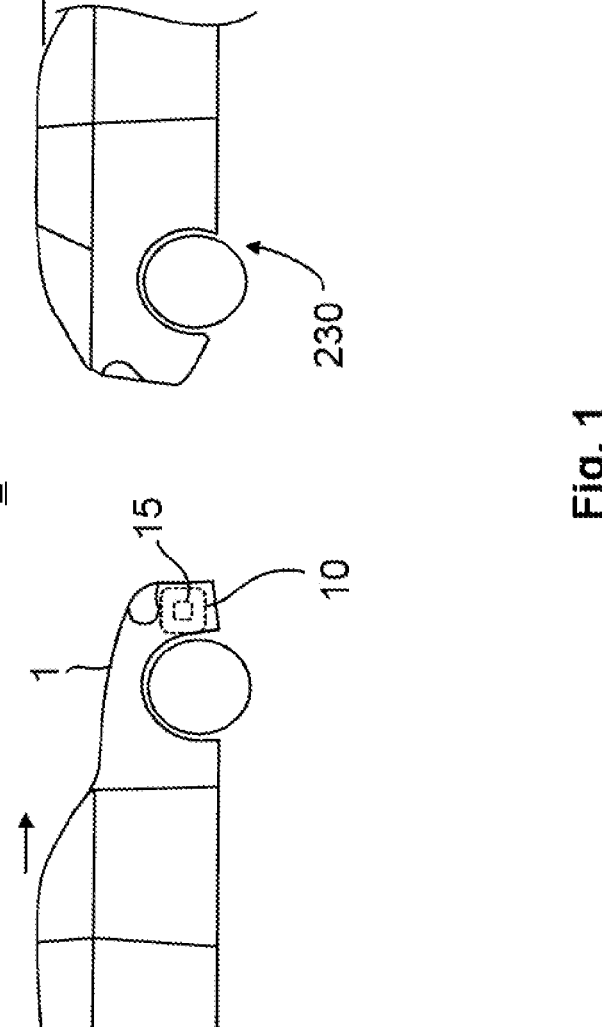
FIG. 1 is a schematic view of a vehicle with a radar system of the invention and a further vehicle traveling in front, each in a side view.

A vehicle 1 with a radar system 10 of the invention is shown schematically in FIG. 1. An arrow symbolizes the direction of movement of vehicle 1. In addition, a target object 230 in the form of another vehicle traveling in front in surroundings 2 of vehicle 1 are shown. Radar system 10 can receive reflections from target object 230 and detect target object 230 based on these reflections and/or reconstruct the surroundings 2. For this purpose, an incoming signal 202 is detected and signal processing of incoming signal 202 is performed, at least partially, by a processing device 15.

Figure 5:
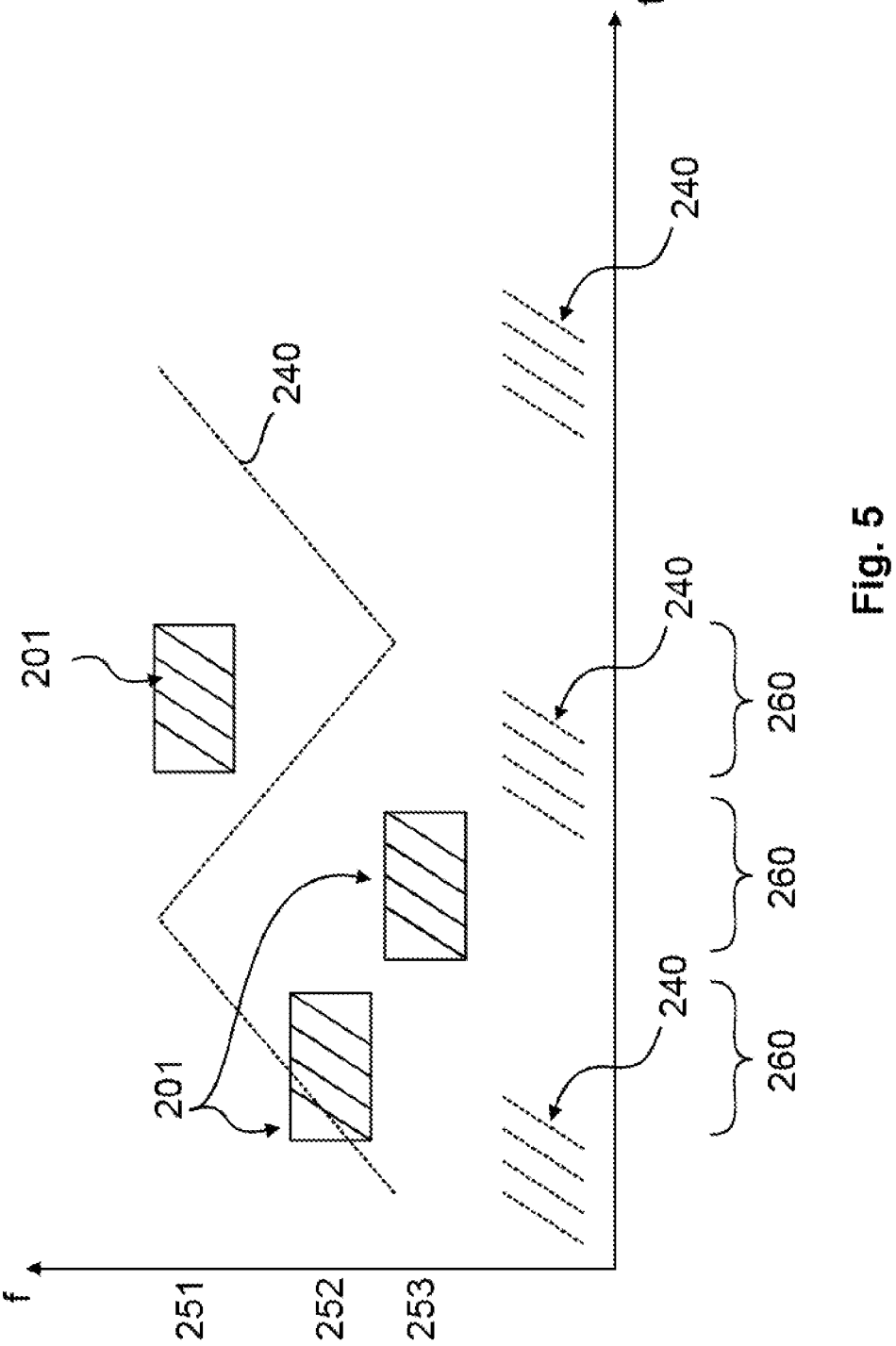
FIGS. 5-7 are schematic diagrams for visualizing a method of the invention.

The described detection of radar system 10 is shown hereafter with further details. First, a transmission signal 201, which is radiated into surroundings 2 of vehicle 1, can be generated by radar system 10. Such a transmission signal 201 is shown by way of example in FIG. 2. Radar system 10 is advantageously a continuous-wave radar and/or an FMCW radar (frequency-modulated continuous-wave radar), which in particular provides a distance and/or speed measurement, preferably by means of the Doppler effect. It can be, for example, a 24 GHz or 77 GHz radar system. Specifically, e.g., the 77 GHz radar system can be operated in the 77 GHz band, and thus provides different frequency ranges 251, 252, 253 shown in FIG. 5 for the transmission signal 201 between f=76 GHz and 77 GHz. The frequency range specifically used for transmission signal 201 can be variably determined by radar system 10 from the possible frequency ranges 251, 252, 253, and thus vary for different detection cycles 260.

Figure 2:
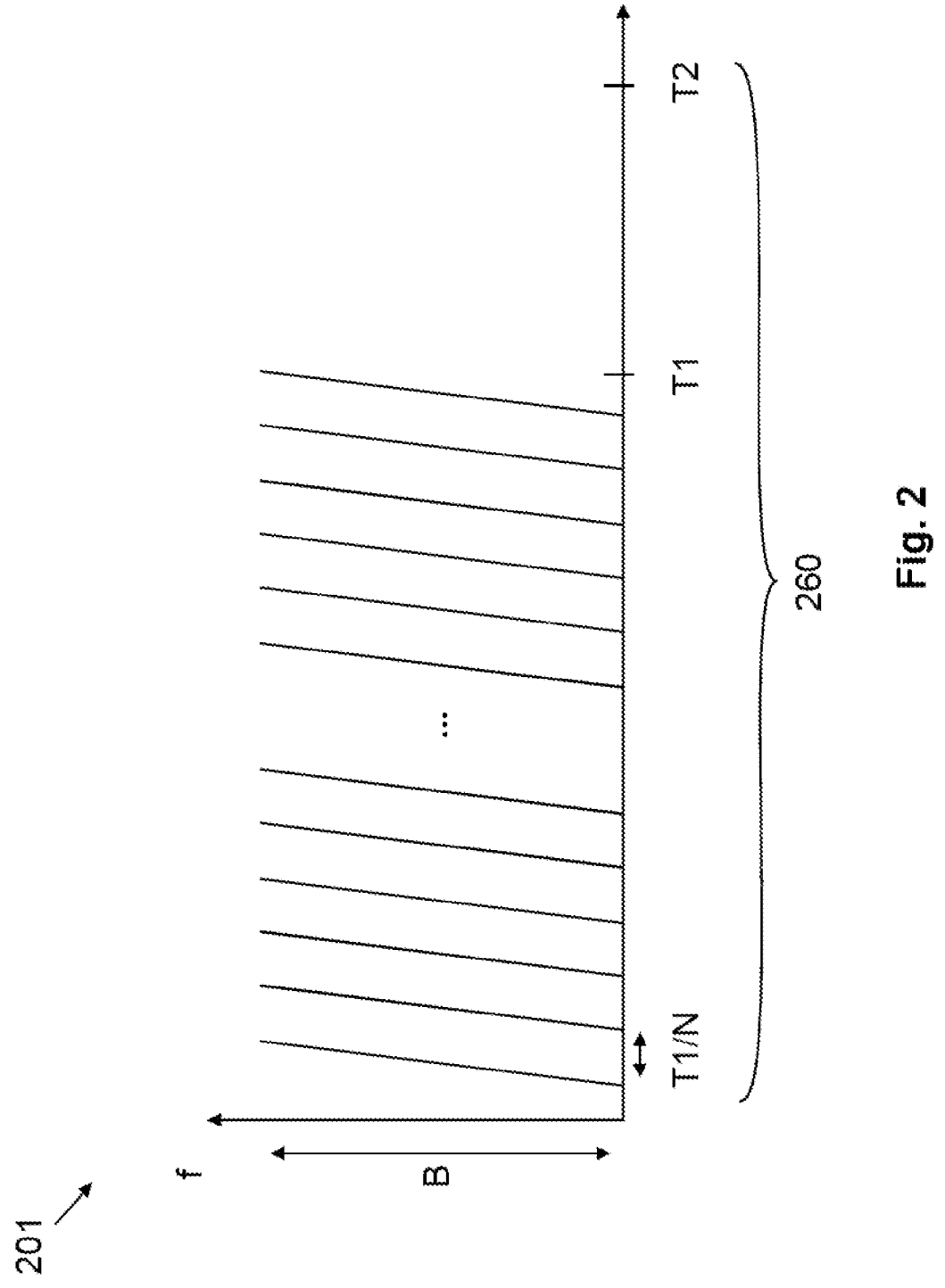
FIG. 2 is a schematic diagram of a transmission signal of a radar system of the invention.

In order to detect parameters of target object 230 in surroundings 2 of vehicle 1, such as, e.g., the distance or speed or the angle, transmission signal 201 can be modulated, e.g., with regard to the frequency f. As also shown in FIG. 2, N frequency chirps can be output sequentially within the time period T1 with a varying frequency f as transmission signal 201 for detection. In the case of such a chirp, the frequency f can change over time in the range of the bandwidth B. For example, 128 chirps are sent out. The center frequency of the chirp can be variably set, if neces-

Figure 3:
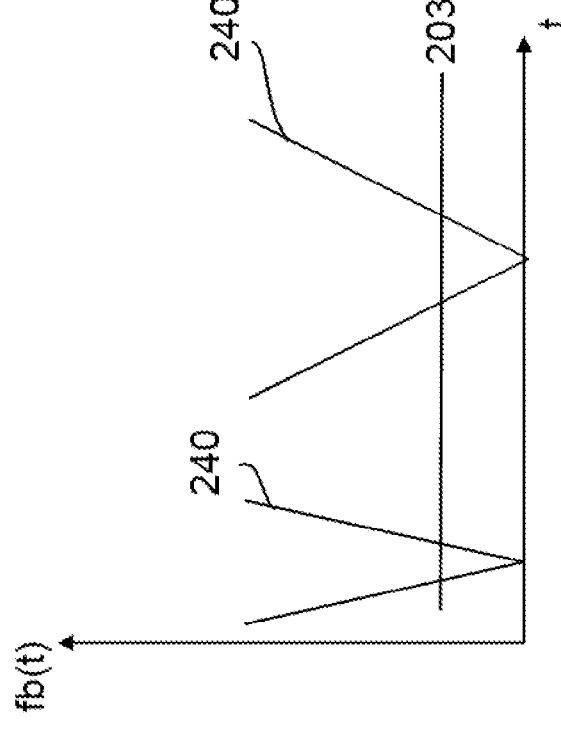
FIG. 3 is a schematic diagram for visualizing an interference in a detection signal and in the resulting baseband signal.
Figure 3:
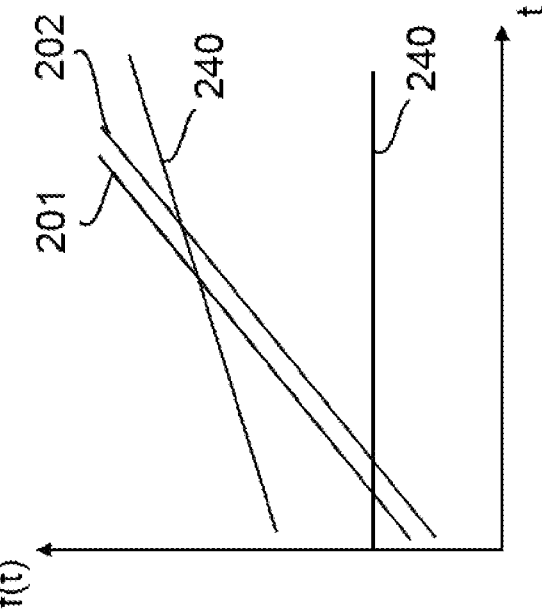

8 sary, i.e., set differently for different detection cycles 260, and thus lie in one of the possible frequency ranges 251, 252, 253. The duration of a particular chirp can be T1/N, as is also shown schematically by a double arrow in FIG. 2. For example, a linear frequency modulation can be used in which the frequency f changes linearly within the bandwidth B in the case of a particular chirp. After the time period T1, an incoming signal 202 (e.g., with 256 samples per chirp) can be detected within the period T2–T1 and an evaluation can be performed by processing device 15. The entire detection cycle 260 thus has a time period T2. Incoming signal 202 is shown in FIG. 3, which, like transmission signal 201, is in the HF (high frequency) band there.

Figure 7:
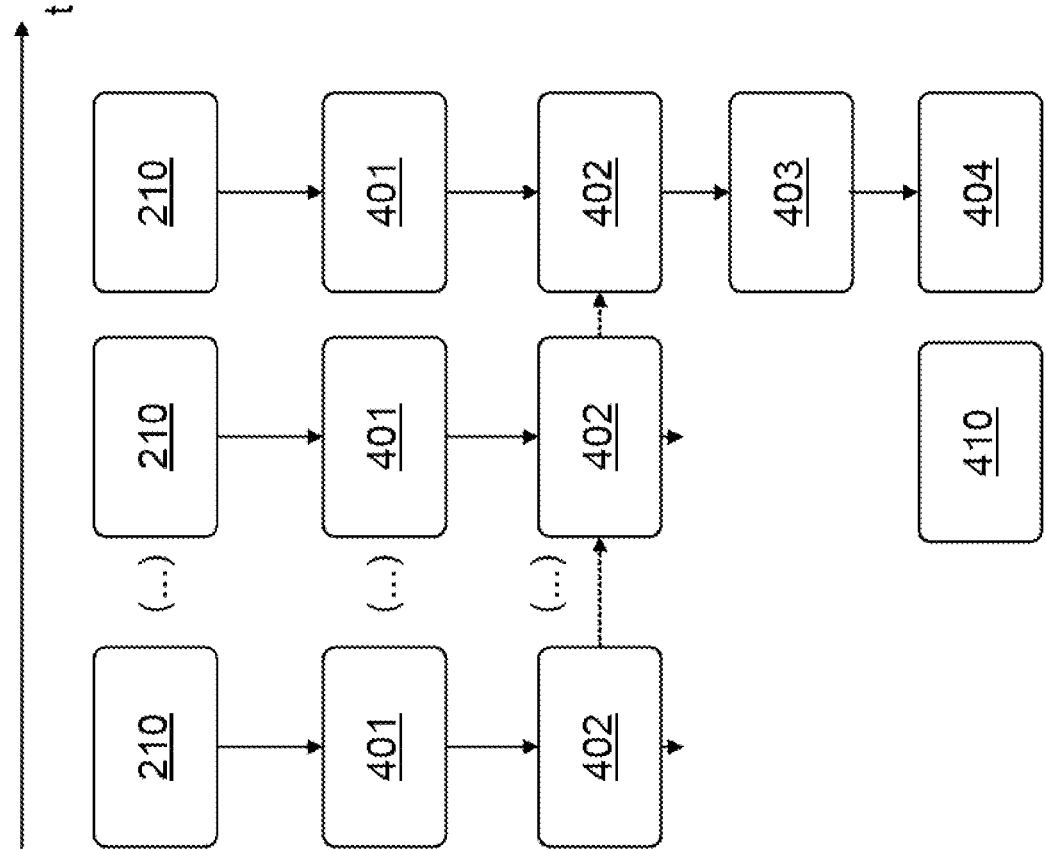

The transmitted transmission signal 201 can be reflected and/or backscattered by target object 230, and thus received by radar system 10. Incoming signal 202 received in this manner can then be demodulated and/or down-converted. In particular, this results in baseband signal 203 shown in FIG. 3, where the frequency fb of the baseband signal depends on the signal propagation time of the reflected transmission signal 201 and thus on the distance of target object 230. Subsequently, the signal resulting from incoming signal 202 can be converted (for example, by an analog-to-digital conversion and possibly further processing) into digital detection information 210. Up to the end of time period T1, the data determined hereby can be stored in an M×N matrix with M samples per chirp and N chirps. For example, M=256 and N=128 are assumed below. A radar frame with the raw data (with 128×256 pixels) can be obtained thereby. This representation then corresponds to the time-frequency space. A non-volatile memory unit of the processing device can be used for storing. Using this matrix, a spectrum, specific for a relative speed and/or a distance of target object 230 in surroundings 2, can then be determined by a Fourier transformation of the matrix (in particular, detection information 210). This is in particular a two-dimensional spectrum (corresponding to the two-dimensional matrix according to detection information 210), so that the different coordinates represent the different parameters (such as the distance and relative speed). Detection information 210 or also information resulting therefrom can be used as input for the evaluation according to FIG. 7.

Figure 4:
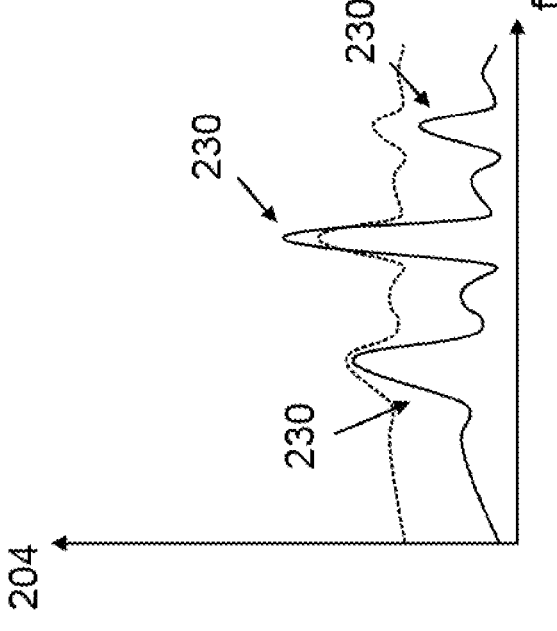
FIG. 4 is a schematic diagram to visualize an effect of interference in the case of a baseband signal in the time and frequency domain.
Figure 4:
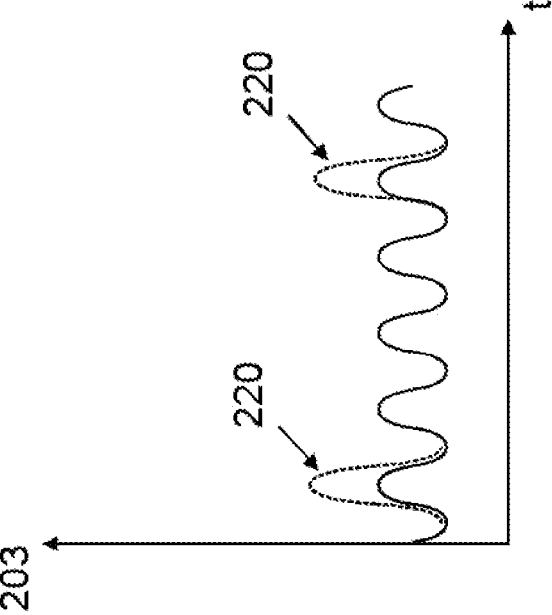

Disturbances and specifically interference can occur in particular when two radar systems in spatial proximity to each other transmit at the same time in the same frequency range. Exemplary interferers 240 of this kind are shown in FIG. 3 with respect to their interfering frequency range next to the corresponding transmission and incoming signals 201, 202 and baseband signal 203 over time t. The result of these interferers 204 is visualized in FIG. 4. In this case, interference 220 can appear in the form of a peak in the time domain, and thus raise the spectrum in the frequency domain. This is problematic because ghost targets can be detected, for example, and the detection of real target 230 can be made more difficult.

Figure 6:
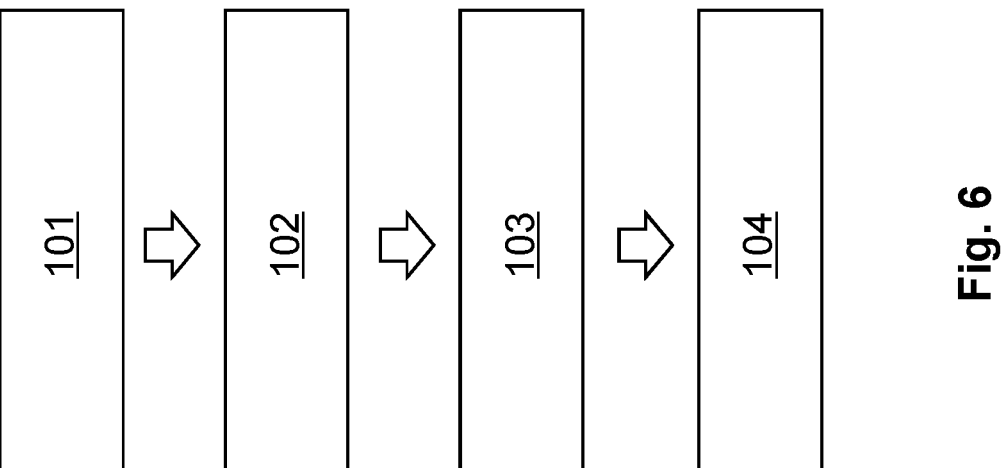

A method of the invention is schematically visualized in FIG. 6. The method is used to detect interference 220 of this kind in a radar system 10 of a vehicle 1. Receiving 101 at least one incoming signal 202 of radar system 10 occurs first. Determining 102 detection information 210 from the incoming signal 202 occurs next. Then, an evaluation 103 of detection information 210 is performed by at least one neural network 401, 402. Finally, according to step 104, the result of evaluation 103 can be used as a prognosis of an interference 220 of incoming signal 202. These steps can be repeated for different detection cycles 260.

In evaluation 103, preprocessing of detection information 210 can be performed first, e.g., max-pooling. Detection information 210 corresponds, e.g., to the raw data of the radar system with 128×256 pixels. To reduce the amount of data, these can then be reduced to, for example, 32×32 pixels. Interferences 220 are detectable in these reduced data as well. Then, according to FIG. 7, these data can be used as input for a CNN 401. CNN 401 can extract the information about interference 220, where the output of CNN 401 can serve as input for RNN 402. Horizontal dashed arrows represent the feature of RNN 402 that previous evaluations can be taken into account. This allows the transmission behavior of interferers 240 to be taken into account over a longer period of time. Subsequently, the output of RNN 402 can serve as a prognosis for a disturbed frequency-time domain in the next detection cycle 260. This can be a segmentation 404, which can be trained by corresponding ground truth data 410. As a further intermediate step, a decoding 403 of the output is optionally provided to obtain segmentation 404.

CNN 401 can have, e.g., an architecture in which the input of CNN 401 is initially processed by alternately performing convolutions and max-pooling functions. In other words, initially (e.g., 3) convolutional layers can be provided, each of which is followed by a pooling layer. Kernel sizes 3×3×1 and/or 3×3×2 of the filter kernels can be used here. Then the output of CNN 401 can be passed to RNN 402. This comprises, e.g., an LSTM (long short-term memory) layer. Finally, the output of RNN 402 can be provided to a decoder, which can comprise, e.g., a fully connected layer and a deconvolution layer.

In response to the output of predicted interference 220, transmission signal 201 can be transmitted in a different frequency range 251, 252, 253, at least in part, in the next detection cycle 260, and thus identify the interference frequency range. Such an adjustment of frequency range 251, 252, 253 is visualized in FIG. 5. Thus, the effect of interference 220 is at least reduced in the next detection cycle 260. However, information about interference 220 can continue to be included in detection information 210 in a temporally encoded manner so that it can continue to be predicted by evaluation 103. It is also conceivable that for the detection of this temporally encoded information about interferences 220, an incoming signal 202 in the interference frequency range continues to be detected at the same time.

The above explanation of the embodiments describes the present invention solely in the context of examples. Of course, individual features of the embodiments can be freely combined with one another, if technically feasible, without departing from the scope of the present invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed:

1. A method for identifying interference in a radar system of a motor vehicle, the method comprising:
   receiving at least one incoming signal of the radar system;
   determining detection information from the incoming signal;
   performing an evaluation of the detection information by at least one neural network; and
   using a result of the evaluation as a prognosis of interference with the incoming signal,

wherein the at least one neural network comprises at least one recurrent neural network which takes into account the evaluations of temporally preceding detection information, and wherein an output of the at least one neural network is used as the result of the evaluation, and
   wherein the at least one neural network comprises at least one convolutional neural network, which receives the detection information as input, and the output of which is used as input to the at least one recurrent neural network.

2. The method according to claim 1, wherein performing the evaluation of the detection information comprises:
   preprocessing the detection information of a detection cycle by max-pooling to reduce a data size of the detection information;
   extracting information about the interference in the form of at least one interference in the incoming signal from the preprocessed detection information by the convolutional neural network; and
   performing a prognosis of the at least one interference for a temporally subsequent detection cycle based on the extracted information or based on the evaluations of temporally preceding detection information.

3. The method according to claim 1, wherein using the result of the evaluation or using the output of the at least one neural network comprises providing the prognosis by an output of the frequency range in which the interference will be present in the future.

4. The method according to claim 1, wherein using the result of the evaluation or using the output of the at least one neural network comprises electronic outputting the result to an electronic system of the vehicle or a control unit of the vehicle.

5. The method according to claim 1, wherein the result of the evaluation comprises a segmentation of the detection information which indicates the predicted interference.

6. The method according to claim 1, wherein the at least one neural network is trained by:
   storing a plurality of temporally successively determined detection information;
   providing ground truth data by labeling of interferences in the detection information; and
   training the at least one neural network using training data formed from the detection information and the ground truth data.

7. The method according to claim 6, wherein providing the ground truth data comprises manually labeling the interferences to teach the at least one neural network by the training to predict the interferences in the incoming signal.

8. The method according to claim 2, wherein for the detection cycle, a plurality of transmission signals of the radar system are transmitted in succession, each in at least one frequency range in order to receive an associated incoming signal, and wherein the transmission signal is implemented as at least one chirp with a time varying frequency within the frequency range.

9. The method according to claim 8, wherein determining the detection information is performed per detection cycle and comprises:
   performing a mixing of the respective transmission signal and the associated incoming signal so as to obtain a baseband signal in each case; and
   determining the detection information from the obtained baseband signals, the detection information being specific to an object detection in surroundings of the vehicle.

10. The method according to claim 8, wherein the result of the evaluation has an indication of a predicted interference frequency range in which the interference is predicted in a temporally subsequent detection cycle, wherein using the result of the evaluation comprises an automatic, at least partial adjustment of a frequency range in which the transmission signals are transmitted and which is at least partially outside the predicted interference frequency range, so that the frequency range is implemented as an at least partially variable frequency range.

11. A radar system for detecting target objects in surroundings of a vehicle, the radar system comprising:

a processing device designed to carry out the steps:

determining detection information from an incoming signal of the radar system;

performing an evaluation of the detection information by at least one neural network; and using a result of the evaluation as a prognosis of interference with the incoming signal, wherein the at least one neural network comprises at least one recurrent neural network which takes into account the evaluations of temporally preceding detection information, and wherein an output of the at least one neural network is used as the result of the evaluation, and wherein the at least one neural network comprises at least one convolutional neural network, which receives the detection information as input, and the output of which is used as input to the at least one recurrent neural network.

12. A non-transitory computer-readable medium storing a computer program comprising instructions which, when executed by a processing device of a radar system, cause the processing device to perform the following steps:

determining detection information from an incoming signal of the radar system;

performing an evaluation of the detection information by at least one neural network; and using a result of the evaluation as a prognosis of interference with the incoming signal, wherein the at least one neural network comprises at least one recurrent neural network which takes into account the evaluations of temporally preceding detection information, and wherein an output of the at least one neural network is used as the result of the evaluation, and wherein the at least one neural network comprises at least one convolutional neural network, which receives the detection information as input, and the output of which is used as input to the at least one recurrent neural network.

* * * * *